United States Patent
Kasturi et al.

(10) Patent No.: US 10,291,476 B1
(45) Date of Patent: May 14, 2019

(54) METHOD AND APPARATUS FOR AUTOMATICALLY DEPLOYING APPLICATIONS IN A MULTI-CLOUD NETWORKING SYSTEM

(71) Applicant: Veritas Technologies LLC, Mountain View, CA (US)

(72) Inventors: Rohini Kumar Kasturi, Sunnyvale, CA (US); Satish Grandhi, Santa Clara, CA (US)

(73) Assignee: Veritas Technologies LLC, Santa Clara, CA (US)

( * ) Notice: Subject to any disclaimer, the term of this patent is extended or adjusted under 35 U.S.C. 154(b) by 0 days.

(21) Appl. No.: 15/593,273

(22) Filed: May 11, 2017

Related U.S. Application Data

(63) Continuation of application No. 14/214,326, filed on Mar. 14, 2014, now Pat. No. 9,680,708.

(51) Int. Cl.
| | |
|---|---|
| *G06F 13/00* | (2006.01) |
| *H04L 12/24* | (2006.01) |
| *H04L 29/08* | (2006.01) |

(52) U.S. Cl.
CPC .......... *H04L 41/0896* (2013.01); *H04L 67/10* (2013.01)

(58) Field of Classification Search
CPC ..... G06F 8/65; H04L 29/06; H04L 29/06047; H04L 29/08072; H04L 29/08981; H04L 41/082; H04L 41/0896; H04L 67/10; G06Q 30/02
USPC ................................................. 709/203, 221
See application file for complete search history.

(56) References Cited

U.S. PATENT DOCUMENTS

| | | |
|---|---|---|
| 6,026,238 A | 2/2000 | Bond et al. |
| 8,145,768 B1 | 3/2012 | Hawthorne |
| 8,166,474 B1 | 4/2012 | Delco et al. |
| 8,312,308 B2 | 11/2012 | Kanekar |
| 8,417,938 B1 | 4/2013 | Considine et al. |
| 8,447,851 B1 | 5/2013 | Anderson et al. |
| 8,572,605 B1 | 10/2013 | Tene et al. |
| 8,627,270 B2 | 1/2014 | Fox et al. |
| 8,682,955 B1 | 3/2014 | Monden et al. |
| 8,856,321 B2 | 10/2014 | Iyengar et al. |
| 8,862,744 B2 | 10/2014 | Garg et al. |
| 8,879,554 B2 | 11/2014 | Emmadi et al. |
| 8,909,784 B2 | 12/2014 | Ferris et al. |

(Continued)

FOREIGN PATENT DOCUMENTS

| | | |
|---|---|---|
| WO | WO 2015/050549 A1 | 4/2015 |

OTHER PUBLICATIONS

Rohini Kumar Kasturi et al., Method and Apparatus for a Highly Scalable, Multi-Cloud Service Deployment, Orchestration and Delivery, U.S. Appl. No. 14/214,326, filed Mar. 14, 2014.

(Continued)

*Primary Examiner* — Robert B Harrell
(74) *Attorney, Agent, or Firm* — FisherBroyles, LLP

(57) ABSTRACT

A multi-cloud fabric includes an application management unit responsive to one or more applications from an application layer. The multi-cloud fabric further includes a controller that is in communication with resources of a cloud. The controller is responsive to the applications and includes a processor operable to analyze the application relative to the resources to cause delivery of the applications to the resources dynamically and automatically.

20 Claims, 7 Drawing Sheets

(56) References Cited

U.S. PATENT DOCUMENTS

| | | |
|---|---|---|
| 8,914,511 B1 | 12/2014 | Yemini et al. |
| 9,032,400 B1 | 5/2015 | Thomas et al. |
| 9,038,151 B1 | 5/2015 | Chua et al. |
| 9,065,832 B2 | 6/2015 | Barzily et al. |
| 9,071,529 B2 | 6/2015 | Garg et al. |
| 9,104,460 B2 | 8/2015 | Jansen |
| 9,112,733 B2 | 8/2015 | Falk et al. |
| 9,141,364 B2 | 9/2015 | Brant et al. |
| 9,143,438 B2 | 9/2015 | Khan et al. |
| 9,183,378 B2 | 11/2015 | Banerjee et al. |
| 9,197,522 B1 | 11/2015 | Arakelian et al. |
| 9,258,742 B1 | 2/2016 | Pianigiani et al. |
| 9,680,708 B2 | 6/2017 | Kasturi |
| 2002/0174219 A1 | 11/2002 | Mei et al. |
| 2002/0194324 A1 | 12/2002 | Guha |
| 2007/0180083 A1 | 8/2007 | Adam et al. |
| 2008/0270199 A1 | 10/2008 | Chess et al. |
| 2009/0077632 A1 | 3/2009 | Carpenter et al. |
| 2009/0089078 A1 | 4/2009 | Bursey |
| 2009/0313004 A1 | 12/2009 | Levi et al. |
| 2010/0042720 A1 | 2/2010 | Stienhans et al. |
| 2010/0125664 A1 | 5/2010 | Hadar et al. |
| 2010/0125844 A1 | 5/2010 | Mousseau et al. |
| 2010/0138816 A1 | 6/2010 | Mokrani et al. |
| 2010/0169490 A1 | 7/2010 | McNair |
| 2010/0199042 A1 | 8/2010 | Bates et al. |
| 2010/0332401 A1 | 12/2010 | Prahlad et al. |
| 2011/0087927 A1 | 4/2011 | Arnold et al. |
| 2011/0209140 A1 | 8/2011 | Scheidel et al. |
| 2011/0213875 A1 | 9/2011 | Ferris et al. |
| 2011/0213886 A1 | 9/2011 | Kelkar et al. |
| 2011/0258461 A1 | 10/2011 | Bates |
| 2011/0271007 A1 | 11/2011 | Wang et al. |
| 2011/0283194 A1 | 11/2011 | Chen et al. |
| 2011/0314145 A1 | 12/2011 | Raleigh et al. |
| 2012/0005262 A1* | 1/2012 | McWhirter ............ G06F 9/541 709/203 |
| 2012/0016977 A1 | 1/2012 | Robertson et al. |
| 2012/0017120 A1 | 1/2012 | Kurapati et al. |
| 2012/0023241 A1 | 1/2012 | Goel et al. |
| 2012/0089726 A1 | 4/2012 | Doddavula |
| 2012/0096134 A1 | 4/2012 | Suit |
| 2012/0117422 A1 | 5/2012 | Radhakrishnan |
| 2012/0137287 A1 | 5/2012 | Pang et al. |
| 2012/0222041 A1 | 8/2012 | Sabin et al. |
| 2012/0239739 A1 | 9/2012 | Manglik et al. |
| 2012/0281708 A1 | 11/2012 | Chauhan et al. |
| 2012/0290702 A1 | 11/2012 | Vincent |
| 2012/0317566 A1 | 12/2012 | Santos et al. |
| 2013/0019015 A1 | 1/2013 | Devarakonda et al. |
| 2013/0031294 A1 | 1/2013 | Feng et al. |
| 2013/0086578 A1 | 4/2013 | Eilam et al. |
| 2013/0091282 A1 | 4/2013 | Tontiruttananon et al. |
| 2013/0124712 A1 | 5/2013 | Parker |
| 2013/0124713 A1 | 5/2013 | Feinberg et al. |
| 2013/0132561 A1 | 5/2013 | Pasala et al. |
| 2013/0152080 A1 | 6/2013 | Sachindran et al. |
| 2013/0185729 A1 | 7/2013 | Vasic et al. |
| 2013/0191542 A1 | 7/2013 | Matczynski et al. |
| 2013/0227349 A1 | 8/2013 | Nodir et al. |
| 2013/0238772 A1 | 9/2013 | Armour et al. |
| 2013/0254375 A1 | 9/2013 | Agiwal et al. |
| 2013/0254891 A1 | 9/2013 | Onoda |
| 2013/0283266 A1 | 10/2013 | Baset et al. |
| 2013/0290941 A1 | 10/2013 | Kruglick |
| 2013/0322366 A1 | 12/2013 | Rácz et al. |
| 2013/0325924 A1 | 12/2013 | Moshfeghi |
| 2013/0326487 A1 | 12/2013 | Yousouf et al. |
| 2013/0339423 A1 | 12/2013 | Degtiarov |
| 2013/0346493 A1 | 12/2013 | Martin |
| 2014/0006581 A1 | 1/2014 | Raghu |
| 2014/0010085 A1 | 1/2014 | Kavunder et al. |
| 2014/0022894 A1 | 1/2014 | Oikawa et al. |
| 2014/0032763 A1 | 1/2014 | Milojicic et al. |
| 2014/0040885 A1 | 2/2014 | Donahue |
| 2014/0067994 A1 | 3/2014 | Puttaswamy Naga et al. |
| 2014/0075412 A1 | 3/2014 | Kannan et al. |
| 2014/0075414 A1 | 3/2014 | Fox et al. |
| 2014/0075431 A1 | 3/2014 | Kumar et al. |
| 2014/0075437 A1 | 3/2014 | Mousseau |
| 2014/0108665 A1 | 4/2014 | Arora et al. |
| 2014/0115578 A1 | 4/2014 | Cooper et al. |
| 2014/0130038 A1 | 5/2014 | Lucovsky et al. |
| 2014/0155043 A1 | 6/2014 | Gell et al. |
| 2014/0215076 A1 | 7/2014 | Grothues |
| 2014/0215464 A1 | 7/2014 | Birke et al. |
| 2014/0233385 A1 | 8/2014 | Beliveau et al. |
| 2014/0259012 A1 | 9/2014 | Nandlall et al. |
| 2014/0280488 A1 | 9/2014 | Voit et al. |
| 2014/0280817 A1 | 9/2014 | Uppalapati et al. |
| 2014/0280835 A1 | 9/2014 | Pruss et al. |
| 2014/0280848 A1 | 9/2014 | Modh et al. |
| 2014/0280966 A1 | 9/2014 | Sapuram et al. |
| 2014/0282536 A1 | 9/2014 | Dave et al. |
| 2014/0282539 A1 | 9/2014 | Sonnek |
| 2014/0317293 A1 | 10/2014 | Shatzkamer |
| 2014/0317923 A1 | 10/2014 | Neal et al. |
| 2014/0337508 A1 | 11/2014 | Manghirmalani et al. |
| 2014/0344439 A1 | 11/2014 | Kempf et al. |
| 2014/0366155 A1 | 12/2014 | Chang et al. |
| 2014/0372993 A1 | 12/2014 | Hoban et al. |
| 2015/0012669 A1 | 1/2015 | Hipp et al. |
| 2015/0026794 A1 | 1/2015 | Zuk et al. |
| 2015/0032846 A1 | 1/2015 | Doken et al. |
| 2015/0033365 A1 | 1/2015 | Mellor et al. |
| 2015/0052517 A1 | 2/2015 | Raghu et al. |
| 2015/0052521 A1 | 2/2015 | Raghu |
| 2015/0052525 A1 | 2/2015 | Raghu |
| 2015/0071285 A1 | 3/2015 | Kumar et al. |
| 2015/0074670 A1 | 3/2015 | Gerganov |
| 2015/0074743 A1 | 3/2015 | Ilieva et al. |
| 2015/0081907 A1 | 3/2015 | Scharf et al. |
| 2015/0088827 A1 | 3/2015 | Xu et al. |
| 2015/0112915 A1 | 4/2015 | Michael et al. |
| 2015/0124813 A1 | 5/2015 | Beliveau et al. |
| 2015/0139238 A1 | 5/2015 | Pourzandi et al. |
| 2015/0154270 A1 | 6/2015 | Marinoiu et al. |
| 2015/0161385 A1 | 6/2015 | Gounares et al. |
| 2015/0169291 A1 | 6/2015 | Dube et al. |
| 2015/0172183 A1 | 6/2015 | DeCusatis et al. |
| 2015/0178349 A1 | 6/2015 | Niewodniczanski et al. |
| 2015/0195303 A1 | 7/2015 | Holden et al. |
| 2015/0199197 A1 | 7/2015 | Maes et al. |
| 2015/0200838 A1 | 7/2015 | Nadeau et al. |
| 2015/0215228 A1 | 7/2015 | McMurry |
| 2015/0236948 A1 | 8/2015 | Dunbar et al. |
| 2015/0244735 A1 | 8/2015 | Kumar et al. |
| 2016/0044035 A1 | 2/2016 | Huang |
| 2016/0073278 A1 | 3/2016 | Roessler et al. |
| 2016/0164750 A1 | 6/2016 | Holkkola |

OTHER PUBLICATIONS

Rohini Kumar Kasturi et al., Process for a Highly Scalable, Distributed, Multi-Cloud Service Deployment, Orchestration and Delivery Fabric, U.S. Appl. No. 14/214,472, filed Mar. 14, 2014.

Rohini Kumar Kasturi et al., Method and Apparatus for Ensuring Application and Network Service Performance in an Automated Manner, U.S. Appl. No, 14/214,572, filed Mar. 14, 2014.

CISCO, The Role of Layer 4-7 Services in Scaling Applications for the Cloud-Computing Data Center, http://www.x.com/c/en/us/products/collateral/application-networking-services/ace-4700-series-application-control-engine-appliances/white_paper_c11-675038.html, (Jun. 10, 2011).

Rohini Kumar Kasturi et al., Method and Apparatus for Rapid Instance Deployment on a Cloud Using a Multi-Cloud Controller, U.S. Appl. No. 14/214,612, filed Mar. 14, 2014.

Rohini Kumar Kasturi et al., Method and Apparatus for Automatic Enablement of Network Services for Enterprises, U.S. Appl. No. 14/214,666, filed Mar. 15, 2014.

Subharthi Paul et al., Application delivery in multi-cloud environments using software defined networking, http://www.sciencedirect.

(56) References Cited

OTHER PUBLICATIONS com/science/article/pii/S1389128614000826, Computer Networks, vol. 68, Communications and Networking in the Cloud, (Aug. 5, 2014).
Yuri Demchenko et al., Defining Generic Architecture for Cloud Infrastructure as a Service Model, http://citeseerx.ist.psu.edu/viewdoc/download?doi=10.1.1.659.8044&rep=rep1&type=pdf, The International Symposium on Grids and Clouds and the Open Grid Forum, Academia Sinica, (Mar. 19-25, 2011).
Vasileios Kotronis et al, Control Exchange Points: Providing QoS-enabled End-to-End Services via SDN-based Inter-domain Routing Orchestration, https://www.usenix.org/system/files/conference/ons2014/ons2014-paper-kotronis.pdf, Open Networking Summit 2014, Research Track, (Mar. 2-4, 2014).
Kapil Bakshi, Secure hybrid cloud computing: Approaches and use cases, http://ieeexplore.ieee.org/document/6836198/, 2014 IEEE Aerospace Conference, (Mar. 1-8, 2014).
Rohini Kumar Kasturi et al., Method and Apparatus for Cloud Bursting and Cloud Balancing of Instances Across Clouds, U.S. Appl. No. 14/214,682, filed Mar. 15, 2014.
Rohini Kumar Kasturi et al., Method and Apparatus for Optimized Network and Service Processing, U.S. Appl. No. 61/978,699, filed Apr. 11, 2014.
Rohini Kumar Kasturi et al., Method and Apparatus for Optimized Network and Service Processing, U.S. Appl. No. 14/684,306, filed Apr. 10, 2015.
Rohini Kumar Kasturi et al., Method and Apparatus to Make Network Elements, L4-L7 Service Elements and Added Services More Intelligent, U.S. Appl. No. 61/977,054, filed Apr. 8, 2014.
Rohini Kumar Kasturi et al., Smart Network and Service Elements, U.S. Appl. No. 14/681,057, filed Apr. 7, 2015.
Manish Sethi et al., A framework for migrating production snapshots of composite applications to virtualized environments, 2011 IFIP/IEEE International Symposium on Integrated Network Management (IM), (May 23-27, 2011).
Rohini Kumar Kasturi et al., Method and Apparatus to Create and Publish User Interface (UI) for any Cloud Management Platform with Centralized Monitoring, Dynamic Orchestration of Applications with Network Services, with Performance and Service Assutance Capabilities Across Mult-Clouds, U.S. Appl. No. 61/977,049, filed Apr. 8, 2014.
Rohini Kumar Kasturi et al., Method and Apparatus for Automating Creation of User Interface Across Multi-Cloud, U.S. Appl. No. 14/681,066, filed Apr. 7, 2015.
Rohini Kumar Kasturi et al., Method and Apparatus for a Fully Automated Engine that Ensures Performance, Service Availability, System Availabiliy, Health Monitoring with Intelligent Dynamic Resource Scheduling and Live Migration Capabilities, U.S. Appl. No. 61/981,626, filed Apr. 18, 2014.
Rohini Kumar Kasturi et al., Method and Apparatus for a Fully Automated Engine that Ensures Performance, Service Availability, System Availabiliy, Health Monitoring with Intelligent Dynamic Resource Scheduling and Live Migration Capabilities, U.S. Appl. No. 14/690,317, filed Apr. 17, 2015.
Srijith K. Nair et al, Towards Secure Cloud Bursting, Brokerage and Aggregation, https://www.flexiant.com/wp-content/uploads/2012/09/Cloud-Brokering-FP7.pdf, 2010 IEEE 8th European Conference on Web Services (ECOWS), (Dec. 1-3, 2010).
Rohini Kumar Kasturi et al., Method and Apparatus Distributed Multi-Cloud Resident Elastic Analytics Engine, U.S. Appl. No. 61/978,078, filed Apr. 10, 2014.
Rohini Kumar Kasturi et al., Method and ApparatusDistributed Multi-Cloud Resident Elastic Analytics Engine, U.S. Appl. No. 14/683,130, filed Apr. 9, 2015.
Rohini Kumar Kasturi et al., Method and Apparatus to Provide Real-Time Cloud Security, U.S. Appl. No. 61/994,115, filed May 15, 2014.
Rohini Kumar Kasturi et al., Method and Apparatus to Provide Real-Time Cloud Security, U.S. Appl. No. 14/706,930, filed May 7, 2015.
Rohini Kumar Kasturi et al., Method and Apparatus for Application and L4-L7 Protocol Aware Dynamic Network Access Control, Threat Management and Optimizations in SDN Based Networks, U.S. Appl. No. 62/001,011, filed May 20, 2014.
Rohini Kumar Kasturi et al., Method and Apparatus for Application and L4-L7 Protocol Aware Dynamic Network Access Control, Threat Management and Optimizations in SDN Based Networks, U.S. Appl. No. 14/702,649, filed May 1, 2015.
Ying Zhang et al., StEERING: A software-defined netowrking for inline service chaining, https://www.researchgate.net/publication/271463475_StEERING_A_software-defined_networking_for_inline_service_chaining, 2013 21st IEEE International Conference on Network Protocols (ICNP), (Oct. 2013).
Guangwu Hu et al., SuperFlow: A Reliable, Controllable and Scalable Architecture for Large-Scale Enterprise Networks, http://www.thucsnet.org/uploads/2/5/2/8/25289795/superflow_-_a_reliable_controllable_and_scalable_architecture_for_large-scale_enterprise_networks.pdf, 2013 IEEE International Conference on High Performance Computing and Communications & 2013 IEEE International Conference on Embedded and Ubiquitoud Computering, (Nov. 13-15, 2013).
Rohini Kumar Kasturi et al., Optimization to Create a Highly Scalable Virtual Netork Service/Application Using Commodity Hardware, U.S. Appl. No. 61/994,098, filed May 15, 2014.
Rohini Kumar Kasturi et al., Optimization to Create a Highly Scalable Virtual Netork Service/Application Using Commodity Hardware, U.S. Appl. No. 14/712,876, filed May 14, 2015.
Jonathan M. McCune et al, TrustVisor: Efficient TCB Reduction and Attestation, https://www.cylab.cmu.edu/files/pdfs/tech_reports/CMUCylab09003.pdf, 2010 IEEE Symposium on Security and Privacy, (Mar. 9, 2009).
Rohini Kumar Kasturi et al., Method and Apparatus to Migrate Applications and Network Service Onto Any Cloud, U.S. Appl. No. 61/994,093, filed May 15, 2014.
Rohini Kumar Kasturi et al., Method and Apparatus to Migrate Applications and Network Services Onto Any Cloud, U.S. Appl. No. 14/712,880, filed May 14, 2015.
Paul Marshall et al., Elastic Site: Using Clouds to Elastically Extend Site Resources, http://ieeexplore.ieee.org/document/5493493/, 2010 10th IEEE/ACM International Conferencec on Cluster, Cloud and Grid Computing (CCGrid), May 17-20, 2010.
Tekin Bicer et al., A Frameworkfor Data-Intensive Computing with Cloud Bursting, http://www.mcs.anl.gov/~bicer/research/papers/cluster2011.pdf, 2011 IEEE International Conference on Cluster Computing (Cluster), (Sep. 26-30, 2011).
Marouen Mechtri., SDM For Inter Cloud Networking, http://ieeexplore.ieee.org/document/6702552/, 2013 IEEE SDN for Future Networks and Services (SDN4FNS), (Nov. 11-13, 2013).
Abhinava Sadasivarao et al., Bursting Data between Data Centers: Case or Transport SDN, http://ieeexplore.ieee.org/document/6627742/, 2013 IEEE 21st Annual Symposium on High-Performance Interconnects (HOTI), (Aug. 21-23, 2013).

* cited by examiner

METHOD AND APPARATUS FOR AUTOMATICALLY DEPLOYING APPLICATIONS IN A MULTI-CLOUD NETWORKING SYSTEM

CROSS REFERENCE TO RELATED APPLICATION

This application is a continuation of U.S. Pat. No. 9,680,708 B2 for U.S. patent application Ser. No. 14/214,326 filed 14 Mar. 2014.

FIELD OF THE INVENTION

Various embodiments of the invention relate generally to a multi-cloud fabric and particularly to a multi-cloud fabric with distributed application delivery.

BACKGROUND

Data centers refer to facilities used to house computer systems and associated components, such as telecommunications (networking equipment) and storage systems. They generally include redundancy, such as redundant data communications connections and power supplies. These computer systems and associated components generally make up the Internet. A metaphor for the Internet is cloud.

A large number of computers connected through a real-time communication network such as the Internet generally form a cloud. Cloud computing refers to distributed computing over a network, and the ability to run a program or application on many connected computers of one or more clouds at the same time.

The cloud has become one of the, or perhaps even the, most desirable platform for storage and networking. A data center with one or more clouds may have real server hardware, and in fact served up by virtual hardware, simulated by software running on one or more real machines. Such virtual servers do not physically exist and can therefore be moved around and scaled up or down on the fly without affecting the end user, somewhat like a cloud becoming larger or smaller without being a physical object. Cloud bursting refers to a cloud becoming larger or smaller.

The cloud also focuses on maximizing the effectiveness of shared resources, resources referring to machines or hardware such as storage systems and/or networking equipment. Sometimes, these resources are referred to as instances. Cloud resources are usually not only shared by multiple users but are also dynamically reallocated per demand. This can work for allocating resources to users. For example, a cloud computer facility, or a data center, that serves Australian users during Australian business hours with a specific application (e.g., email) may reallocate the same resources to serve North American users during North America's business hours with a different application (e.g., a web server). With cloud computing, multiple users can access a single server to retrieve and update their data without purchasing licenses for different applications.

Cloud computing allows companies to avoid upfront infrastructure costs, and focus on projects that differentiate their businesses instead of infrastructure. It further allows enterprises to get their applications up and running faster, with improved manageability and less maintenance, and enables information technology (IT) to more rapidly adjust resources to meet fluctuating and unpredictable business demands.

Fabric computing or unified computing involves the creation of a computing fabric consisting of interconnected nodes that look like a 'weave' or a 'fabric' when viewed collectively from a distance. Usually this refers to a consolidated high-performance computing system consisting of loosely coupled storage, networking and parallel processing functions linked by high bandwidth interconnects.

The fundamental components of fabrics are "nodes" (processor(s), memory, and/or peripherals) and "links" (functional connection between nodes). Manufacturers of fabrics include IBM and BROCADE. The latter are examples of fabrics made of hardware. Fabrics are also made of software or a combination of hardware and software.

A traditional data center employed with a cloud may suffer from latency and crashes due to underestimated usage. Furthermore, such a data center may inefficiently use storage and networking systems of the cloud. Perhaps most importantly of all, such a data center may manually deploy applications. Application deployment services may be performed, in large part, manually with elaborate infrastructure and/or numerous teams of professionals, and potential failures due to unexpected bottlenecks. Some of the foregoing translate to high costs. Lack of automation results in delays in launching business applications. It is estimated that application delivery services currently consume approximately thirty percent of the time required for deployment operations. Additionally, scalability of applications across multiple clouds is nearly nonexistent.

There is therefore a need for a method and apparatus to decrease bottleneck, latency, infrastructure, and costs while increasing efficiency and scalability of a data center.

SUMMARY

Briefly, an embodiment of the invention includes a multi-cloud fabric that includes an application management unit responsive to one or more applications from an application layer. The multi-cloud fabric further includes a controller that is in communication with resources of a cloud. The controller is responsive to the one or more applications and includes a processor operable to analyze the same relative to the resources of the cloud to cause delivery of the one or more applications to the resources dynamically and automatically.

A further understanding of the nature and the advantages of particular embodiments disclosed herein may be realized by reference of the remaining portions of the specification and the attached drawings.

DETAILED DESCRIPTION OF EMBODIMENTS

The following description describes a multi-cloud fabric. The multi-cloud fabric has a controller and spans homogeneously and seamlessly across the same or different types of clouds, as discussed below.

Particular embodiments and methods of the invention disclose a virtual multi-cloud fabric. Still other embodiments and methods disclose automation of application delivery by use of the multi-cloud fabric.

In other embodiments, a data center includes a plug-in, application layer, multi-cloud fabric, network, and one or more the same or different types of clouds.

Figure 1:
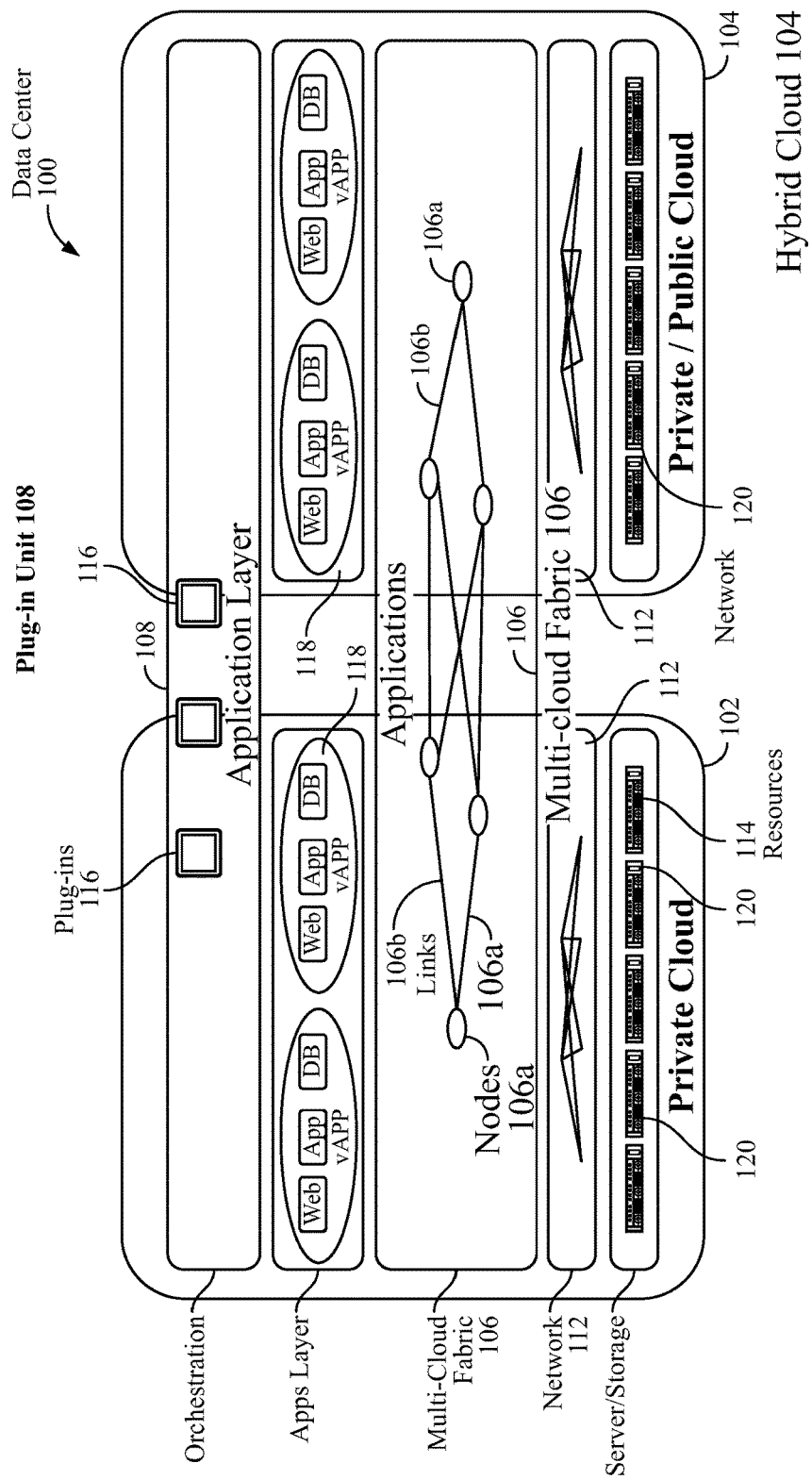
FIG. 1 shows a data center 100, in accordance with an embodiment of the invention.

Referring now to FIG. 1, a data center 100 is shown, in accordance with an embodiment of the invention. The data center 100 is shown to include a private cloud 102 and a hybrid cloud 104. A hybrid cloud is a combination public and private cloud. The data center 100 is further shown to include a plug-in unit 108 and a multi-cloud fabric 106 spanning across the private cloud 102 and hybrid cloud 104. Each of private cloud 102 and hybrid cloud 104 are shown to include a respective application layer 110, a network 112, and resources 114.

The network 112 may include switches and the like and the resources 114 may include routers, servers, and other networking and/or storage equipment.

Each respective application layer 110 is shown to include applications 118 and resources 114 further include machines, such as servers, storage systems, switches, servers, routers, or any combination thereof.

The plug-in unit 108 is shown to include various plug-ins. As an example, in the embodiment of FIG. 1, plug-in unit 108 is shown to include several distinct plug-ins 116, such as one made by OPENSOURCE, another made by MICROSOFT, INC., and yet another made by VMWARE, INC. Each of the foregoing plug-ins typically have different formats. The plug-in unit 108 converts all of the various formats of the applications into one or more native formats for use by the multi-cloud fabric 106. The native-format application(s) is passed through the application layer 110 to the multi-cloud fabric 106.

The multi-cloud fabric 106 is shown to include various nodes 106a and links 106b connected together in a weave-like fashion.

In some embodiments of the invention, the plug-in unit 108 and the multi-cloud fabric 106 do not span across clouds and the data center 100 includes a single cloud. In embodiments with the plug-in unit 108 and multi-cloud fabric 106 spanning across clouds, such as that of FIG. 1, resources of the two clouds (i.e., the private cloud 102 and the hybrid cloud 104) are treated as resources of a single unit. For example, an application may be distributed across the resources of both the private cloud 102 and the hybrid cloud 104 homogeneously thereby making the clouds seamless. This allows use of analytics, searches, monitoring, reporting, displaying and otherwise data crunching thereby optimizing services and use of resources of the private cloud 102 and the hybrid cloud 104 collectively.

While two clouds are shown in the embodiment of FIG. 1, it is understood that any number of clouds, including one cloud, may be employed. Furthermore, any combination of private, public and hybrid clouds may be employed. Alternatively, one or more of the same type of cloud may be employed.

In an embodiment of the invention, the multi-cloud fabric 106 is a Layer (L) 4-7 fabric. Those skilled in the art appreciate data centers with various layers of networking. As earlier noted, multi-cloud fabric 106 is made of nodes 106a and connections (i.e., links 106b). In an embodiment of the invention, the nodes 106a are devices, such as but not limited to L4-L7 devices. In some embodiments, the multi-cloud fabric 106 is implemented in software and, in other embodiments, it is made with hardware and, in still others, it is made with hardware and software.

The multi-cloud fabric 106 sends the application to the resources 114 through the network 112.

In an SLA engine, as will be discussed relative to a subsequent figure, data is acted upon in real-time. Further, the data center 100 dynamically and automatically delivers applications, virtually or in physical reality, in a single or multi-cloud of either the same or different types of clouds.

The data center 100, in accordance with some embodiments and methods of the invention, may serve as a service (e.g., Software as a Service (SAAS)) model, a software package through existing cloud management platforms, and/or a physical appliance for high scale requirements. Further, licensing can be throughput or flow-based and can be enabled with network services only, network services with SLA and elasticity engine (as will be further evident below), network service enablement engine, and/or multi-cloud engine.

As will be further discussed below, the data center 100 may be driven by representational state transfer (REST) application programming interface (API).

The data center 100, with the use of the multi-cloud fabric 106, eliminates the need for an expensive infrastructure, manual and static configuration of resources, limitation of a single cloud, and delays in configuring the resources, among other advantages. Rather than a team of professionals configuring the resources for delivery of applications over months of time, the data center 100 automatically and dynamically does the same, in real-time. Additionally, more features and capabilities are realized with the data center 100 over that of prior art. For example, due to multi-cloud and virtual delivery capabilities, cloud bursting to existing clouds is possible and utilized only when required to save resources and therefore expenses.

Moreover, the data center 100 effectively has a feedback loop that results from monitoring traffic, performance, usage, time, resource limitations and the like (i.e., the configuration of the resources can be dynamically altered based on the monitored information). A log of information pertaining to configuration, resources, the environment, and the like allow the data center 100 to provide a user with pertinent information to enable the user to adjust and substantially optimize its usage of resources and clouds. Similarly, the data center 100 itself can optimize resources based on the foregoing information.

Figure 2:
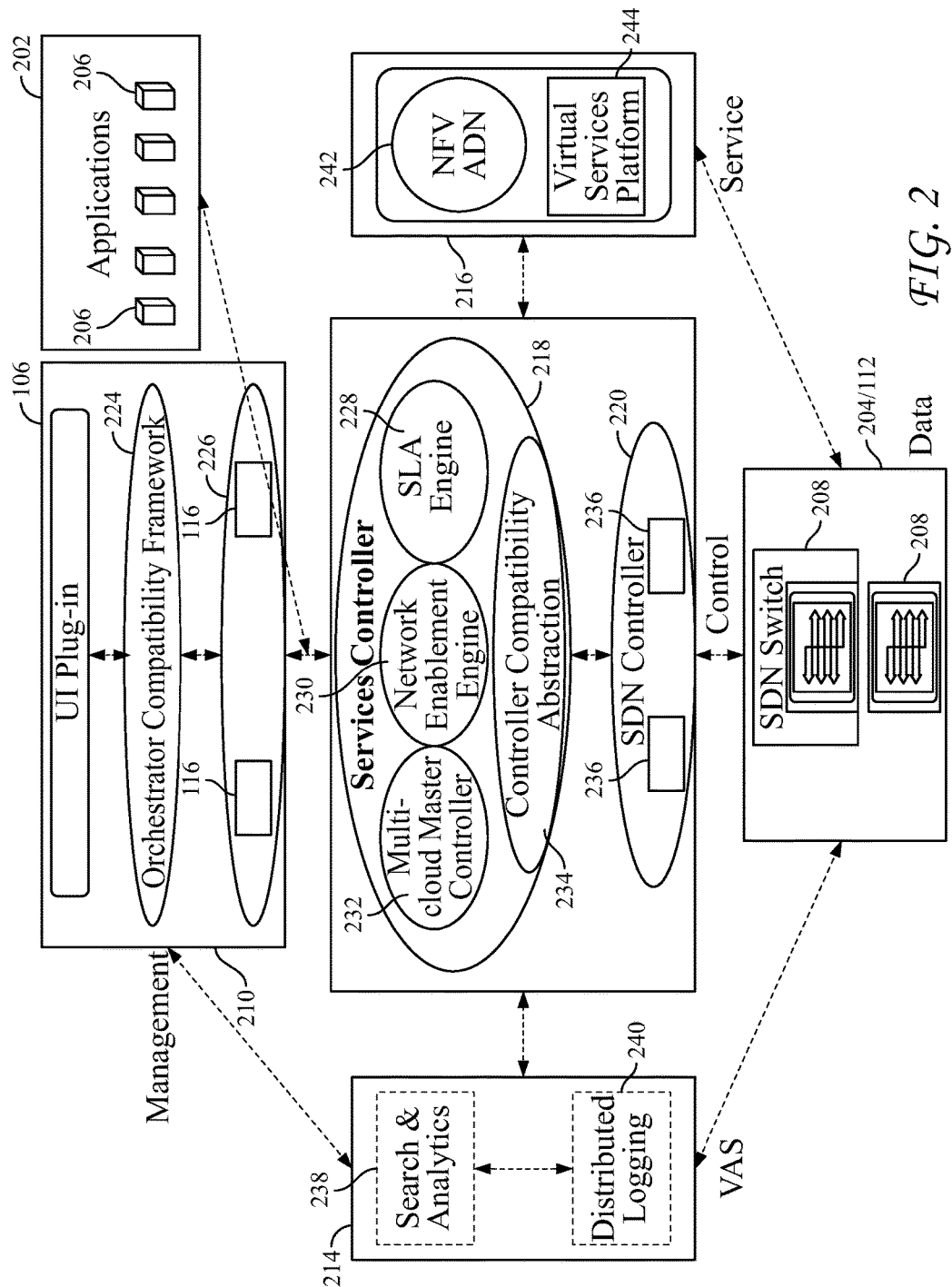
FIG. 2 shows further details of relevant portions of the data center 100 and in particular, the multi-cloud fabric 106 of FIG. 1.

FIG. 2 shows further details of relevant portions of the data center 100 and in particular, the multi-cloud fabric 106 of FIG. 1. The multi-cloud fabric 106 is shown to be in communication with an applications unit 202 and a network 204, which is shown to include a number of Software Defined Networking (SDN)-enabled controllers and switches 208. The network 204 is analogous to the network 112 of FIG. 1.

The applications unit 202 is shown to include a number of applications 206, for instance, for an enterprise. These applications are analyzed, monitored, searched, and otherwise crunched just like the applications from the plug-ins of the multi-cloud fabric 106 for ultimate delivery to resources through the network 204.

In FIG. 2, the data center 100 is shown to include five units (or planes): the management unit 210, the value-added services (VAS) unit 214, the controller unit 212, the service unit 216 and the data unit (i.e., network 204). Accordingly and advantageously, control, data, VAS, network services and management are provided separately. Each of the planes is an agent and the data from each of the agents is crunched by the controller unit 212 and the VAS unit 214.

In FIG. 2, the multi-cloud fabric 106 is shown to include the management unit 210, the VAS unit 214, the controller unit 212 and the service unit 216. The management unit 210 is shown to include a user interface (UI) plug-in 222, an orchestrator compatibility framework 224, and applications 226. The management unit 210 is analogous to the plug-in unit 108 in FIG. 1. The UI plug-in 222 and the applications 226 receive applications of various formats and the orchestrator compatibility framework 224 translates the various formatted application into native-format applications. Examples of the plug-ins 116, located in the applications 226, may include VMWARE ICENTER by VMWARE, INC. and SYSTEM CENTER by MICROSOFT, INC. While two plug-ins are shown in FIG. 2, it is understood that any number may be employed.

The controller unit 212 (also referred to herein as "multi-cloud master controller") serves as the master or brain of the data center 100 in that it controls the flow of data throughout the data center 100 and timing of various events, to name a couple of many other functions it performs as the mastermind of the data center. In FIG. 2, the controller unit 212 is shown to include a services controller 218 and an SDN controller 220. The services controller 218 is shown to include a multi-cloud master controller 232, an application delivery services stitching engine or network enablement engine 230, an SLA engine 228, and a controller compatibility abstraction 234.

Typically, one of the clouds of a multi-cloud network is the master of the clouds and includes a multi-cloud master controller that talks to local cloud controllers (or managers) to help configure the topology among other functions. The master cloud includes an SLA engine (such as the SLA engine 228) whereas other clouds need not to but all clouds include an SLA agent and an SLA aggregator with the former typically being a part of a virtual services platform, such as virtual services platform 244, and the latter being a part of a search and analytics module, such as search and analytics unit 238.

The controller compatibility abstraction 234 provides abstraction to enable handling of different types of controllers (e.g., SDN controllers 236) in a uniform manner to offload traffic in the switches and routers of the network 204. This increases response time and performance as well as allowing more efficient use of the network.

The network enablement engine 230 performs stitching where an application or network service (such as configuring load balance) is automatically enabled. This eliminates the need for the user to work on meeting, for instance, a load balance policy. Moreover, it allows scaling out automatically when violating a policy.

The multi-cloud master control 232 (e.g., a flex-cloud engine) handles multi-cloud configurations such as determining, for instance, which cloud is less costly, or whether an application must go onto more than one cloud based on a particular policy, or the number and type of cloud that is best suited for a particular scenario.

The SLA engine 228 monitors various parameters in real-time and decides if policies are met. Exemplary parameters include different types of SLAs and application parameters. Examples of different types of SLAs include network SLAs and application SLAs. The SLA engine 228, besides monitoring allows for acting on the data, such as service plane (L4-L7), application, network data and the like, in real-time.

The practice of service assurance enables Data Centers (DCs) and/or Cloud Service Providers (CSPs) to identify faults in the network and resolve these issues in a timely manner so as to minimize service downtime. The practice also includes policies and processes to proactively pinpoint, diagnose and resolve service quality degradations or device malfunctions before subscribers (users) are impacted.

In some embodiments, service assurance may encompass the following: fault and event management, performance management, probe monitoring, quality of service (QoS) management, network and service testing, customer experience management, real-time SLA monitoring and assurance, service and application availability, and trouble ticket management.

The structures shown included in the controller unit 212 are implemented using one or more processors executing software (or code) and in this sense, the controller unit 212 may be a processor. Alternatively, any other structures in FIG. 2 may be implemented as one or more processors executing software. In other embodiments, the controller unit 212 and perhaps some or all of the remaining structures of FIG. 2 may be implemented in hardware or a combination of hardware and software.

The VAS unit 214 uses its search and analytics unit 238 to search analytics (e.g., based on a distributed large data engine) and crunches data and displays analytics. The search and analytics unit 238 can filter all of the logs a distributed logging unit 240 of the VAS unit 214 logs, based on the customer's (user's) desires. Examples of analytics include events and logs. The VAS unit 214 also determines configurations such as who needs SLA, who is violating SLA, and the like.

The SDN controller 220, which includes software defined network programmability, such as those made by FLOODLIGHT, OPEN DAYLIGHT, PDX, and other manufacturers, receives all the data from the network 204 and allows for programmability of a network switch/router.

The service unit 216 is shown to include an API based, Network Function Virtualization (NFV), Application Delivery Network (ADN) 242 and a distributed virtual services platform 244. The service unit 216 activates the right components based on rules. It includes ADC, web-application firewall, DPI, VPN, DNS and other L4-L7 services and configures based on policy (it is completely distributed). It can also include any application or L4-L7 network services.

The distributed virtual services platform 244 may contain, for example, an Application Delivery Controller (ADC), Web Application Firewall (Firewall), L2-L3 Zonal Firewall (ZFW), Virtual Private Network (VPN), Deep Packet Inspection (DPI), and various other services that can be enabled as a single-pass architecture. The service unit 216 may contain, for example, a Configuration agent, a Stats/Analytics reporting agent, a Zero-copy driver to send and receive packets in a fast manner, a Memory mapping engine that maps memory via TLB to any virtualized platform/hypervisor, an SSL offload engine, etc.

Figure 3:
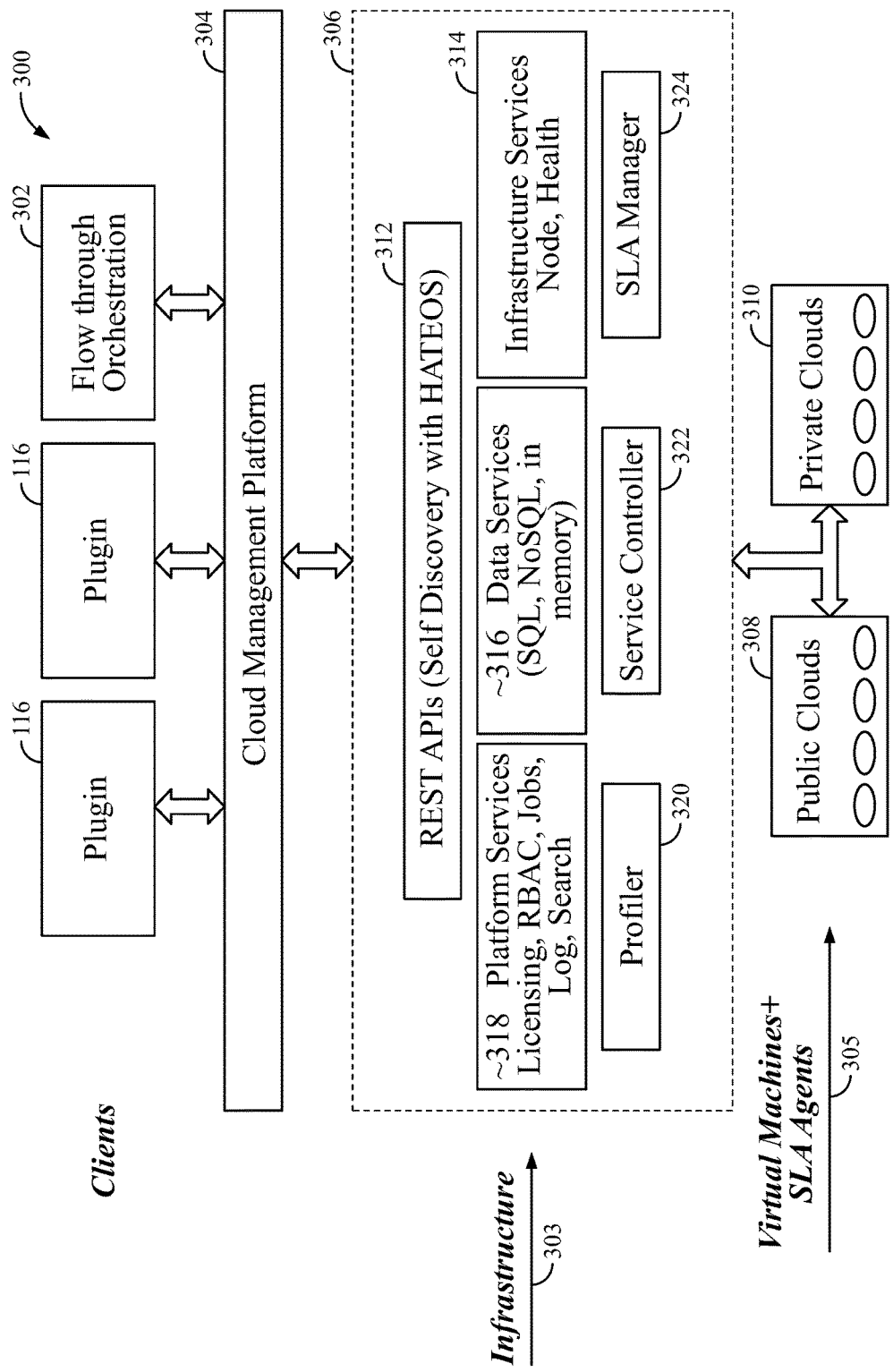
FIG. 3 shows conceptually various features of a data center 300, in accordance with an embodiment of the invention.

FIG. 3 shows conceptually various features of a data center 300, in accordance with an embodiment of the invention. The data center 300 is analogous to the data center 100 except some of the features/structures of the data center 300 are in addition to those shown in the data center 100. The data center 300 is shown to include plug-ins 116, flow-through orchestration 302, cloud management platform 304, controller 306, public clouds 308 and private clouds 310.

The controller 306 is analogous to the controller unit 212 of FIG. 2. In FIG. 3, the controller 306 is shown to include a REST APIs-based invocations for self-discovery (i.e., REST APIs 312), platform services 318, data services 316, infrastructure services 314, profiler 320, service controller 322, and SLA manager 324.

The flow-through orchestration 302 is analogous to the orchestrator compatibility framework 224 of FIG. 2. Plug-ins 116 and flow-through orchestration 302 provide applications to the cloud management platform 304, which converts the formats of the applications to native format. The native-formatted applications are processed by the controller 306. The RESI APIs 312 drive the controller 306. The platform services 318 is for services such as licensing, Role Based Access and Control (RBAC) jobs, log, and search. The data services 316 is to store data of various components, services, applications, databases such as Search and Query Language (SQL), NoSQL, data in memory. The infrastructure services 314 is for services such as node and health.

The profiler 320 is a test engine. Service controller 322 is analogous to the SDN controller 220 and SLA manager 324 is analogous to the SLA engine 228 of FIG. 2. During testing by the profiler 320, simulated traffic is run through the data center 300 to test for proper operability as well as adjustment of parameters such as response time, resource and cloud requirements, and processing usage.

In the exemplary embodiment of FIG. 3, the controller 306 interacts with public clouds 308 and private clouds 310. Both the public clouds 308 and the private clouds 310 may include multiple clouds and may communicate not only with the controller 306 but also with each other. Benefits of the clouds communicating with one another include, without limitation, optimization of traffic path, dynamic traffic steering, and/or reduction of costs.

The plug-ins 116 and the flow-through orchestration 302 are the clients of the data center 300, the controller 306 is the infrastructure of the data center 300, and the public clouds 308 and the private clouds 310 are the virtual machines and SLA agents 305 of the data center 300.

Figure 4:
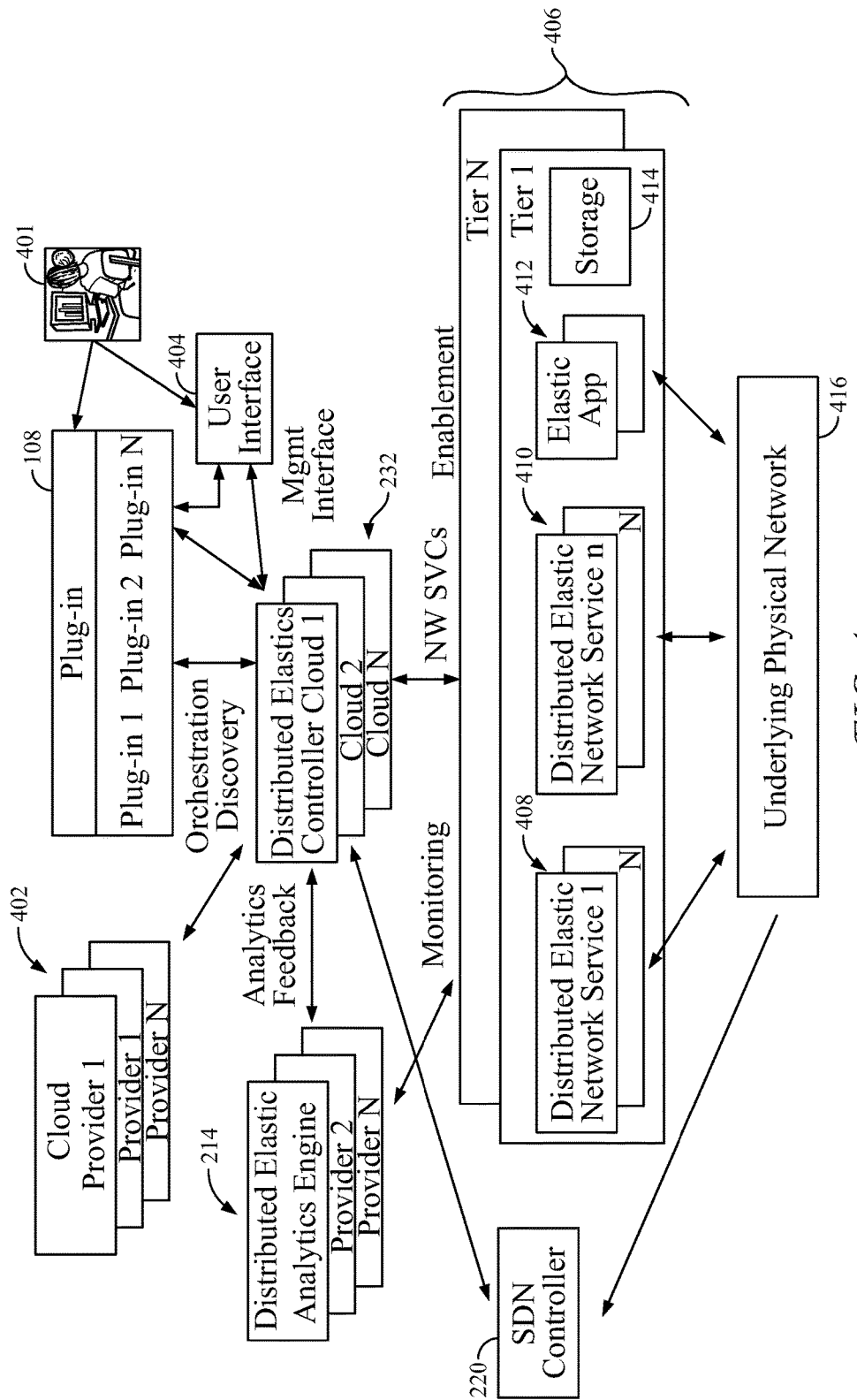
FIG. 4 shows, in conceptual form, a relevant portion of a multi-cloud data center 400, in accordance with another embodiment of the invention.

FIG. 4 shows, in conceptual form, relevant portions of a multi-cloud data center 400, in accordance with another embodiment of the invention. A client 401 (i.e., a user) is shown to use the multi-cloud data center 400, which is shown to include plug-in unit 108, cloud providers 402(1)-(N), a distributed elastic analytics engine (i.e., including multiple instances of the VAS unit 214), a distributed elastic controller of clouds, also known herein as a "flex cloud engine" (i.e., multi-cloud master controller 232, tiers 406 (1)-(N), underlying physical network 416, such as Servers, Storage, Network elements, etc., and SDN controller 220.

Each tier within tiers 406(1)-(N) is shown to include multiple distributed elastic network services (i.e., distributed elastic network service 408—distributed elastic network service 410), elastic applications 412, and storage 414. The distributed elastic network services (i.e., distributed elastic network service 408—distributed elastic network service 410) communicate bidirectionally with the underlying physical network 416 and the latter unilaterally provides information to the SDN controller 220. A part of each of the tiers within tiers 406(1)-(N) is included in the service unit 216 of FIG. 2.

The cloud providers 402(1)-(N) are providers of the clouds shown and/or discussed herein. The multi-cloud master controller 232 (as depicted in FIG. 4) includes multiple distributed elastic controllers each of which services a cloud from one of the cloud providers 402(1)-(N), as discussed previously except that in FIG. 4, there are N number of clouds, "N" being an integer value.

As previously discussed, the distributed elastic analytics engine includes multiple instances of the VAS unit 214, one for each of the clouds, and the analytics are provided to the multi-cloud master controller 232 for various reasons, one of which is the feedback feature discussed earlier. The multi-cloud master controller 232 also provides information to the distributed elastic analytics engine, as discussed above.

The distributed elastic network service 408 through the distributed elastic network service 410 (representing services 1-N, "N" being an integer value) are analogous to the services illustrated in FIG. 3 (i.e., the platform services 318, the data services 316, and the infrastructure services 314) except that in FIG. 4, the services are shown to be distributed, as are the controllers within multi-cloud master controller 232 and the instances of VAS unit 214 within the distributed elastic analytics. Such distribution allows flexibility in the use of resource allocation therefore minimizing costs to the user among other advantages.

The underlying physical network 416 is analogous to the resources 114 of FIG. 1 and that of other figures herein. The underlying network 416 includes servers for running any applications, storage, and/or network elements such as routers, switches, etc. The storage 414 is also a part of the underlying network 416 (analogous to resources 114).

The tiers 406 are deployed across multiple clouds and are subject to enablement. Enablement refers to evaluation of applications for L4 through L7. An example of enablement is stitching.

In summary, in one embodiment of the invention, the disclosed data center is multi-cloud and capable of application deployment, application orchestration, and application delivery.

In operation, client 401 interacts with the user interface 404 and through the user interface 404, client 401 interacts with the plug-in unit 108. Alternatively, the client 401 interacts directly with the plug-in unit 108. The plug-in unit 108 receives applications from the client 401 with perhaps certain specifications. As illustrated in FIG. 4, orchestration and discovery take place between the plug-in unit 108 and the controllers within the multi-cloud master controller 232 and between the cloud providers 402(1)-(N) and the controllers within the multi-cloud master controller 232. A management interface (such as the management unit 210 illustrated in FIG. 2) manages the interactions between the controllers within the multi-cloud master controller 232 and the plug-in unit 108.

The distributed elastic analytics engine (which includes multiple instances of the VAS unit 214) and the tiers 406(1)-(N) perform monitoring of various applications, application delivery services and network elements and the controllers within the multi-cloud master controller 232 effectuate service change.

In accordance with various embodiments and methods of the invention, some of which are shown and discussed herein, a multi-cloud fabric is disclosed. The multi-cloud fabric includes an application management unit responsive to one or more applications from an application layer. The multi-cloud fabric further includes a controller in communication with resources of a cloud, the controller is responsive to the received application and includes a processor operable to analyze the received application relative to the resources to cause delivery of the one or more applications to the resources dynamically and automatically.

The multi-cloud fabric, in some embodiments of the invention, is virtual. In some embodiments of the invention, the multi-cloud fabric is operable to deploy the one or more native-format applications automatically and/or dynamically. In still other embodiments of the invention, the controller is in communication with resources of more than one cloud.

The processor of the multi-cloud fabric is operable to analyze applications relative to resources of more than one cloud.

In an embodiment of the invention, a Value Added Services (VAS) unit is in communication with the controller and the application management unit and the VAS unit is operable to provide analytics to the controller. The VAS unit is operable to perform a search of data provided by the controller and filters the searched data based on the user's specifications (or desire).

In an embodiment of the invention, the multi-cloud fabric includes a service unit that is in communication with the controller and operative to configure data of a network based on rules from the user or otherwise.

In some embodiments, the controller includes a cloud engine that assesses multiple clouds relative to an application and resources. In an embodiment of the invention, the controller includes a network enablement engine.

In some embodiments of the invention, the application deployment fabric includes a plug-in unit responsive to applications with different format applications and operable to convert the different format applications to a native-format application. The application deployment fabric can report configuration and analytics related to the resources to the user. The application deployment fabric can have multiple clouds including one or more private clouds, one or more public clouds, or one or more hybrid clouds. A hybrid cloud is private and public.

The application deployment fabric configures the resources and monitors traffic of the resources, in real-time, and based at least on the monitored traffic, re-configure the resources, in real-time.

In an embodiment of the invention, the multi-cloud fabric can stitch end-to-end, i.e. an application to the cloud, automatically.

In an embodiment of the invention, the SLA engine of the multi-cloud fabric sets the parameters of different types of SLA in real-time.

In some embodiments, the multi-cloud fabric automatically scales in or scales out the resources. For example, upon an underestimation of resources or unforeseen circumstances requiring addition resources, such as during a SUPER BOWL game with subscribers exceeding an estimated and planned for number, the resources are scaled out and perhaps use existing resources, such as those offered by AMAZON, INC. Similarly, resources can be scaled down.

The following are some, but not all, various alternative embodiments. The multi-cloud fabric is operable to stitch across the cloud and at least one more cloud and to stitch network services, in real-time.

The multi-cloud fabric is operable to burst across clouds other than the cloud and access existing resources.

The controller of the multi-cloud fabric receives test traffic and configures resources based on the test traffic.

Upon violation of a policy, the multi-cloud fabric automatically scales the resources.

The SLA engine of the controller monitors parameters of different types of SLA in real-time.

The SLA includes application SLA and networking SLA, among other types of SLA contemplated by those skilled in the art.

The multi-cloud fabric may be distributed and it may be capable of receiving more than one application with different formats and to generate native-format applications from the more than one application.

The resources may include storage systems, servers, routers, switches, or any combination thereof.

The analytics of the multi-cloud fabric include but not limited to traffic, response time, connections/sec, throughput, network characteristics, disk I/O or any combination thereof.

In accordance with various alternative methods of delivering an application by the multi-cloud fabric, the multi-cloud fabric receives at least one application, determines resources of one or more clouds, and automatically and dynamically delivers the at least one application to the one or more clouds based on the determined resources. Analytics related to the resources are displayed on a dashboard or otherwise and the analytics help cause the multi-cloud fabric to substantially optimally deliver the at least one application.

Figure 4A:
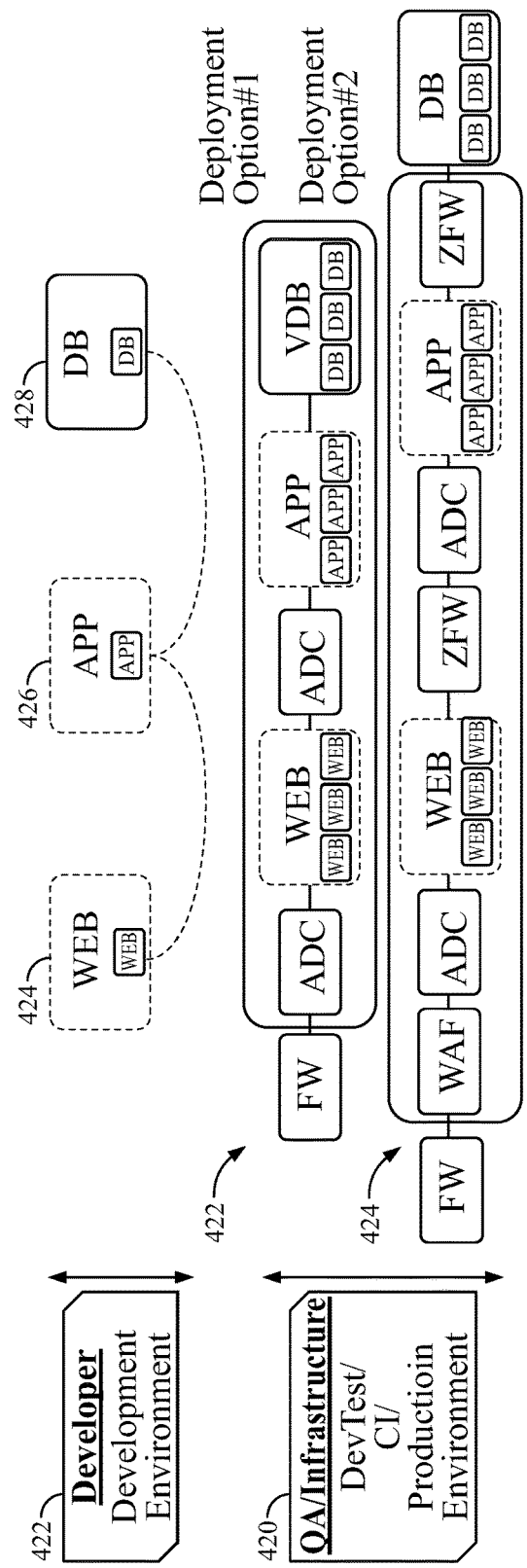
FIGS. 4a-c show exemplary data centers configured using embodiments and methods of the invention.
Figure 4B:
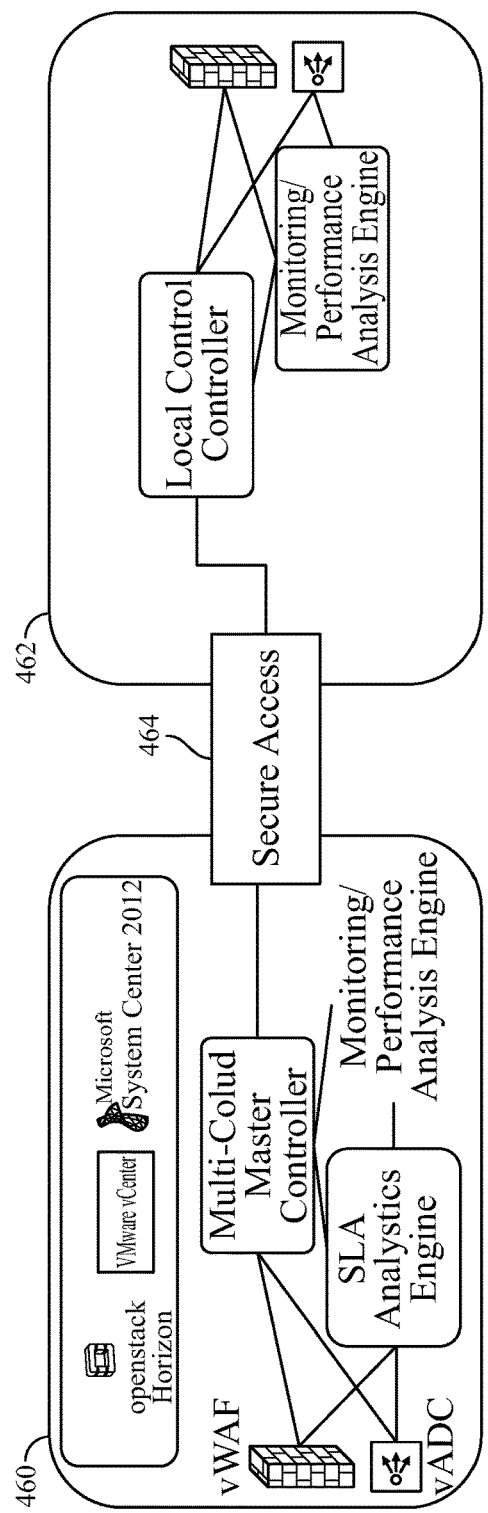
Figure 4C:
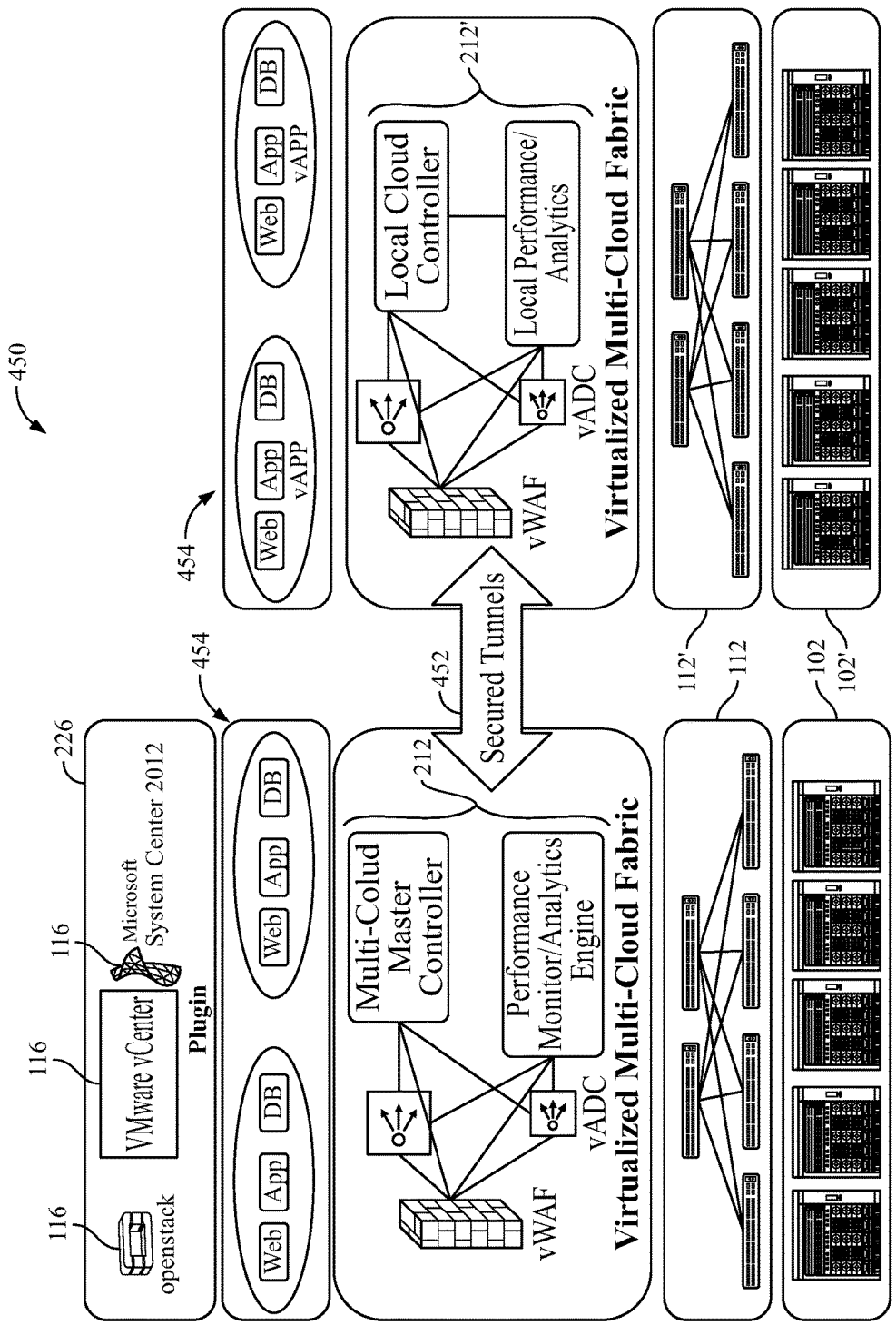

FIGS. 4a-c show exemplary data centers configured using embodiments and methods of the invention. FIG. 4a shows the example of a work flow of a 3-tier application development and deployment. At development environment 422 is shown a developer's development environment including a web tier 424, an application tier 426, and a database 428, each used by a user for different purposes typically and perhaps requiring its own security measure. For example, a company like YAHOO, INC. may use the web tier 424 for its web and the application tier 426 for its applications and the database 428 for its sensitive data. Accordingly, the database 428 may be a part of a private cloud rather than a public cloud. The web tier 424, the application tier 426, and database 428 are all linked together.

At 420, a development testing and production environment is shown. At 422, an optional deployment is shown with a firewall (FW), ADC, a web tier (such as the web tier 424), another ADC, an application tier (such as the application tier 426), and a virtual database (same as the database 428). ADC is essentially a load balancer. This deployment may not be optimal and actually far from it because it is an initial pass and without the use of some of the optimizations done by various methods and embodiments of the invention. The instances of this deployment are stitched together (or orchestrated).

At 424, another optional deployment is shown with perhaps greater optimization. A FW is followed by a web-application FW (WFW), which is followed by an ADC and so on. Accordingly, the instances shown at 424 are stitched together.

Accordingly, consistent development/production environments are realized. Automated discovery, automatic stitching, test and verify, real-time SLA, automatic scaling up/down capabilities of the various methods and embodiments of the invention may be employed for the three-tier (web, application, and database) application development and deployment of FIG. 4a. Further, deployment can be done in minutes due to automation and other features. Deployment can be to a private cloud, public cloud, or a hybrid cloud or multi-clouds.

FIG. 4b shows an exemplary multi-cloud environment having a public, private, or hybrid cloud 460 and another public or private or hybrid cloud 460 in communication through a secure access 464. The cloud 460 is shown to include a multi-cloud master controller whereas the cloud 462 is shown to include a slave or local cloud controller. Accordingly, an SLA engine resides in the cloud 460.

FIG. 4c shows a virtualized multi-cloud fabric 450 spanning across multiple clouds (i.e., private cloud 102 and cloud 102') with a single point of control and management (i.e., a master instance of the controller unit 212 that includes a multi-cloud master controller and a performance monitor/analytics engine). As illustrated in FIG. 4c, private cloud 102 is associated with the master instance of the controller unit 212, network 112, applications 226, plug-ins 116 (i.e., an OPENSTACK plug-in, a VMWARE VCENTER plug-in and a MICROSOFT SYSTEM CENTER 2012 plug-in), and optional deployments 454. As illustrated in FIG. 4c, cloud 102' is associated with an additional network 112', a local instance of the controller unit 212 (i.e., a local controller unit 212') that includes a local cloud controller and a local performance monitor/analytics engine, and optional deployments 454. As illustrated in FIG. 4c, the master instance of the controller unit 212 may access the local controller unit 212' a using secured tunnels 452.

Although the description has been described with respect to particular embodiments thereof, these particular embodiments are merely illustrative, and not restrictive.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

What is claimed is:

1. A computer-implemented method for automatically deploying different format applications in a multi-cloud networking system, at least a portion of the method being performed by a computing device comprising at least one processor, the method comprising:
   providing, to a user associated with a user development environment, a plug-in unit responsive to applications with different native formats, wherein:
      the user development environment comprises a plurality of tiers;
      a first tier within the plurality of tiers comprises a web tier that utilizes at least one of a public cloud and a hybrid cloud;
      a second tier within the plurality of tiers comprises an application tier that utilizes at least one of a public cloud and a hybrid cloud;
      a third tier within the plurality of tiers comprises a database that utilizes at least one of a private cloud and a hybrid cloud;
      each tier within the plurality of tiers is linked together;
   receiving, via the plug-in unit, an application from the user development environment;
   selecting, from a plurality of different types of clouds operating within the multi-cloud networking system, a cloud to be used for deploying the application, wherein the selected cloud represents a first type of cloud comprising a public cloud, a private cloud, or a hybrid cloud;
   automatically converting a native format of the application to a native format of the selected cloud;
   automatically deploying the converted application to the selected cloud;
   receiving, via the plug-in unit, an additional application from the user development environment;
   selecting, from the plurality of different types of clouds operating within the multi-cloud networking system, an additional cloud to be used for deploying the additional application, wherein the additional cloud represents a second type of cloud, comprising a public cloud, a private cloud, or a hybrid cloud, that is different than the first type of cloud;
   automatically converting a native format of the additional application to a native format of the selected additional cloud;
   automatically deploying the converted additional application to the selected additional cloud;
   enhancing the speed of application deployment by performing the preceding steps.

2. The computer-implemented method of claim 1, wherein:
   automatically deploying the converted application to the selected cloud comprises configuring, in real-time, one or more network resources on the selected cloud for the converted application;
   automatically deploying the converted additional application to the selected additional cloud comprises configuring, in real-time, one or more network resources on the selected additional cloud for the converted additional application.

3. The computer-implemented method of claim 2, further comprising:
   after deploying the converted application to the selected cloud and the converted additional cloud to the selected additional cloud, monitoring traffic of the network resources;
   reconfiguring the network resources, in real-time, based at least in part on the monitored traffic.

4. The computer-implemented method of claim 1, wherein each tier within the plurality of tiers requires a different security measure.

5. The computer-implemented method of claim 1, wherein the user development environment utilizes the third tier for sensitive data.

6. The computer-implemented method of claim 1, wherein:
   the application comprises a distributed web server application;
   the selected cloud comprises a cloud associated with the first tier.

7. The computer-implemented method of claim 1, wherein each tier within the plurality of tiers is deployed across multiple clouds.

8. The computer-implemented method of claim 1, wherein the plurality of different types of clouds comprises a plurality of clouds associated with a different vendor.

9. The computer-implemented method of claim 1, wherein the multi-cloud networking system comprises a software-defined virtual multi-cloud networking system.

10. A multi-cloud networking system comprising an application deployment fabric that automatically deploys applications by:
    providing, to a user associated with a user development environment, a plug-in unit, which is stored in memory of a data center of the application deployment fabric, that is responsive to applications with different native formats, wherein:
- the user development environment comprises a plurality of tiers;
- a first tier within the plurality of tiers comprises a web tier that utilizes at least one of a public cloud and a hybrid cloud;
- a second tier within the plurality of tiers comprises an application tier that utilizes at least one of a public cloud and a hybrid cloud;
- a third tier within the plurality of tiers comprises a database that utilizes at least one of a private cloud and a hybrid cloud;
- each tier within the plurality of tiers is linked together;

receiving, via the plug-in unit, an application from the user development environment;

selecting, from a plurality of different types of clouds operating within the multi-cloud networking system, a cloud to be used for deploying the application, wherein the selected cloud represents a first type of cloud comprising a public cloud, a private cloud, or a hybrid cloud;

using the plug-in unit to automatically convert a native format of the application to a native format of the selected cloud;

automatically deploying the converted application to the selected cloud;

receiving, via the plug-in unit, an additional application from the user development environment;

selecting, from the plurality of different types of clouds operating within the multi-cloud networking system, an additional cloud to be used for deploying the additional application, wherein the additional cloud represents a second type of cloud, comprising a public cloud, a private cloud, or a hybrid cloud, that is different than the first type of cloud;

using the plug-in unit to automatically convert a native format of the additional application to a native format of the selected additional cloud;

automatically deploying the converted additional application to the selected additional cloud; and enhancing the speed of application deployment by performing the preceding steps.

11. The multi-cloud networking system of claim 10, wherein:
- the application deployment fabric automatically deploys the converted application to the selected cloud by configuring, in real-time, one or more network resources on the selected cloud for the converted application;
- the application deployment fabric automatically deploys the converted additional application to the selected additional cloud by configuring, in real-time, one or more network resources on the selected additional cloud for the converted additional application.

12. The multi-cloud networking system of claim 11, wherein:
- after deploying the converted application to the selected cloud and the converted additional cloud to the selected additional cloud, the application deployment fabric:
  - monitors traffic of the network resources;
  - reconfigures the network resources, in real-time, based at least in part on the monitored traffic.

13. The multi-cloud networking system of claim 10, wherein each tier within the plurality of tiers requires a different security measure.

14. The multi-cloud networking system of claim 10, wherein the user development environment utilizes the third tier for sensitive data.

15. The multi-cloud networking system of claim 10, wherein:
- the application comprises a distributed web server application;
- the selected cloud comprises a cloud associated with the first tier.

16. The multi-cloud networking system of claim 10, wherein each tier within the plurality of tiers is deployed across multiple clouds.

17. The multi-cloud networking system of claim 10, wherein the plurality of different types of clouds comprises a plurality of clouds associated with a different vendor.

18. The multi-cloud networking system of claim 10, wherein the multi-cloud networking system comprises a software-defined virtual multi-cloud networking system.

19. A non-transitory computer-readable medium comprising one or more computer-readable instructions that, when executed by at least one processor of a computing device, cause the computing device to:
- provide, to a user associated with a user development environment, a plug-in unit that is responsive to applications with different native formats, wherein:
  - the user development environment comprises a plurality of tiers;
  - a first tier within the plurality of tiers comprises a web tier that utilizes at least one of a public cloud and a hybrid cloud;
  - a second tier within the plurality of tiers comprises an application tier that utilizes at least one of a public cloud and a hybrid cloud;
  - a third tier within the plurality of tiers comprises a database that utilizes at least one of a private cloud and a hybrid cloud;
- each tier within the plurality of tiers is linked together;
- receive, via the plug-in unit, an application from the user development environment, wherein the selected cloud represents a first type of cloud comprising a public cloud, a private cloud, or a hybrid cloud;
- select, from a plurality of different types of clouds operating within a multi-cloud networking system, a cloud to be used for deploying the application, wherein the selected cloud represents a first type of cloud comprising a public cloud, a private cloud, or a hybrid cloud;
- automatically convert a native format of the application to a native format of the selected cloud;
- automatically deploy the converted application to the selected cloud;
- receive, via the plug-in unit, an additional application from the user development environment;
- select, from the plurality of different types of clouds operating within the multi-cloud networking system, an additional cloud to be used for deploying the additional application, wherein the additional cloud represents a second type of cloud, comprising a public cloud, a private cloud, or a hybrid cloud, that is different than the first type of cloud;
- automatically convert a native format of the additional application to a native format of the selected additional cloud;
- automatically deploy the converted additional application to the selected additional cloud.

20. The non-transitory computer-readable medium of claim 19, wherein the plurality of different types of clouds comprises a plurality of clouds associated with a different vendor.

\* \* \* \* \*